United States Patent [19]

Maruyama et al.

[11] Patent Number: 5,214,049

[45] Date of Patent: May 25, 1993

[54] RESIN COMPOSITION

[75] Inventors: Takashi Maruyama, Kobe; Yukio Mizuno, Niihama, both of Japan

[73] Assignee: Sumitomo Chemical Company, Limited, Osaka, Japan

[21] Appl. No.: 806,784

[22] Filed: Dec. 12, 1991

Related U.S. Application Data

[63] Continuation of Ser. No. 429,005, Oct. 30, 1989, abandoned.

[30] Foreign Application Priority Data

Nov. 9, 1988 [JP] Japan .................. 63-284125

[51] Int. Cl.$^5$ .................................... C08K 5/09
[52] U.S. Cl. .................... 524/291; 524/310; 524/320; 524/539
[58] Field of Search ............... 524/291, 310, 320, 539

[56] References Cited

U.S. PATENT DOCUMENTS

| | | | |
|---|---|---|---|
| 4,786,664 | 11/1988 | Yates, III | 524/417 |
| 4,873,286 | 10/1989 | Gallucci et al. | 525/392 |

FOREIGN PATENT DOCUMENTS

| | | |
|---|---|---|
| 0148774 | 1/1985 | European Pat. Off. . |
| 0234060 | 12/1986 | European Pat. Off. . |
| 0282052 | 3/1988 | European Pat. Off. . |
| 51-21664 | of 1976 | Japan . |
| 60-221459 | 11/1985 | Japan . |
| 62-257958 | 11/1987 | Japan . |
| 63-350 | 1/1988 | Japan . |
| 8505372 | 5/1985 | PCT Int'l Appl. . |
| 8700850 | 8/1987 | PCT Int'l Appl. . |
| 8700850 | 2/1987 | World Int. Prop. O. . |

*Primary Examiner*—Ralph H. Dean, Jr.
*Assistant Examiner*—Karen A. Dean
*Attorney, Agent, or Firm*—Stevens, Davis, Miller & Mosher

[57] ABSTRACT

The present invention provides a resin composition which is excellent in balance of mechanical properties and processability, solvent resistance and chemical resistance. This composition comprises:

(a) a polyphenylene ether resin,
(b) a thermoplastic polyester resin, and
(c) a compound represented by the formula:

$$(HO)_m R^1 (COOR^2)_n$$

wherein $R^1$ represents a straight or branched chain saturated aliphatic hydrocarbon group of 2-20 carbon atoms, $R^2$ represents a hydrogen atom or an alkyl or aryl group of 1-20 carbon atoms and $R^1$ and $R^2$ may be identical or different and m and n each represents an integer of 1 or more or a derivative thereof.

This composition may further contain a rubber-like polymer.

11 Claims, No Drawings

RESIN COMPOSITION

This application is a continuation of application Ser. No. 07/429,005 filed Oct. 30, 1989, now abandoned.

BACKGROUND OF THE INVENTION

The present invention relates to a resin composition containing polyphenylene ether resin which can be made into shaped articles, sheets and the like by injection molding, extrusion molding, blow molding, and the like.

More particularly, it relates to a thermoplastic resin composition which comprises a resin composition comprising a polyphenylene ether and a thermoplastic polyester, to which is added an aliphatic hydroxycarboxylic acid or a derivative thereof. This thermoplastic resin composition has excellent mechanical properties, processability, solvent resistance and chemical resistance.

Polyphenylene ether resin has excellent heat resistance, but has difficulties in processability and solvent resistance, whereby the scope of use thereof is limited.

In order to improve processability and impact strength, blends of polyphenylene ether with styrene resin have been widely used. However, these resin compositions still have problems in solvent resistance and scope of their use is also limited. For example, they are not suitable to the field which requires endurance against solvents such as gasoline.

On the other hand, thermoplastic polyesters represented by polybutylene terephthalate and polyethylene terephthalate are superior in solvent resistance and are widely used for automobile parts, electric and electronic parts and other mechanical parts.

However, these polyesters have defects such as low heat distortion temperature, large molding shrinkage, great linear expansion coefficient and hence they cannot be applied, as they are, to the uses where load is applied at high temperatures or dimensional accuracy is required. Therefore, it has been proposed to incorporate therein reinforcing agents such as glass fibers, but the molded articles have defects such as poor appearance and warpage. Therefore, these resins cannot be applied to the uses which require severe conditions for appearance and shapes such as outer ply materials of automobiles.

A composition of polyphenylene ether and polyester as one which offsets the defects and makes use of the best characteristics of both resins has been proposed, for example, in Japanese Patent Kokoku No. 51-21664.

In the coposition proposed, compatibility between polyphenylene ether resin and polyester resin is very poor which results in insufficient mechanical properties and oil resistance. Besides, molded articles obtained by injection molding or the like are inferior in surface appearance due to insufficient dispersion of polyphenylene ether and polyester.

Therefore, use of a so-called compatibilizing agent has been proposed in order to improve dispersibility of the polyphenylene ether phase, the polyester phase and stabilize the phase.

For example, Japanese Patent Kokai No. 60-221459 has proposed addition of a styrene resin having an epoxy group and Japanese Patent Kokai Nos. 62-257958 and 63-350 have proposed adding a compatibilizing agent such as maleic anhydride having simultaneously an unsaturated group and a carboxyl group or derivative thereof.

SUMMARY OF THE INVENTION

The object of the present invention is to provide a resin composition which comprises polyphenylene ether and polyester and which is superior in solvent resistance and mechanical properties such as impact resistance and is well balanced in heat resistance and processability and is free from separation between the polyphenylene ether phase and the polyester phase and can give molded articles superior in appearance.

As a result of intensive research conducted by the inventors, it has been found that the above object can be attained by adding an aliphatic hydroxy-carboxylic acid having a specific structure or a derivative thereof to polyphenylene ether and polyester.

That is, the present invention relates to a resin composition which comprises:

(a) a polyphenylene ether resin,
(b) a thermoplastic polyester resin, and
(c) a compound represented by the formula:

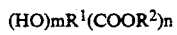

wherein $R^1$ represents a straight or branched chain saturated aliphatic hydrocarbon group of 2–10 carbon atoms, $R^2$ represents a hydrogen atom or an alkyl or aryl group of 1–20 carbon atoms and $R^1$ and $R^2$ may be identical or different and m and n each represents an integer of 1 or more.

DESCRIPTION OF THE INVENTION

Polyphenylene ether resin used in the present invention is a polymer obtained by oxidative polymerization of a phenol compound represented by the formula:

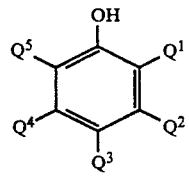

wherein $Q^1$, $Q^2$, $Q^3$, $Q^4$ and $Q^5$ each represents a hydrogen atom, a halogen atom, a hydrocarbon group, or a substituted hydrocarbon group and at least one of them is a hydrogen atom, with oxygen or an oxygen-containing gas using an oxidative coupling catalyst.

Examples of $Q^1$, $Q^2$, $Q^3$, $Q^4$, and $Q^5$ are hydrogen, chlorine, fluorine, bromine, and iodine atoms, and methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, and ethylphenyl groups.

Preferred examples of the phenol compound of the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, and 2,3,5-, 2,3,6- or 2,4,6-trimethylphenol. These phenol compounds may be used alone or in combination of two or more.

Furthermore, there may also be used copolymers of the phenol compounds of the above formula with other phenol compounds, for example, dihydric phenols such as bisphenol A, tetrabromobisphenol A, resorcin, and hydroquinone. Especially preferred are homopolymers and copolymers of 2,6-dimethylphenol and 2,3,6-trimethylphenol.

The oxidative coupling catalyst used for oxidative polymerization of the phenol compounds is not critical and any catalyst can be used as far as it has polymerization ability. Examples are cuprous salt-tertiary amine such as cuprous chloride-trimethylamine, cuprous acetate-triethylamine and cuprous chloride-pyridine; cupric salt-tertiary amine-alkali metal hydroxide such as cupric chloride-pyridine-potassium hydroxide; manganese salt-primary amine such as manganese chloride-ethanolamine and manganese acetate-ethylenediamine; manganese salt-alcoholate or phenolate such as manganese chloride-sodium methylate and manganese chloride-oodium phenolate; manganese salt-alkali hydroxide-amine such as manganese chloride-NaOH- diethanolamine-dibutylamine, mananese chloride-NaOH-triethanolamine-dibutylamine, and manganese chloride-NaOH-monoethanolamine-dibutylamine; and cobalt salt-tertiary amine.

The intrinsic viscosity of polyphenylene ether used as component (a) in the present invention is not critical, but preferably 0.2–1.0 dl/g, more preferably 0.25–0.6 dl/g (measured in chloroform at 30° C.) and it is easy for one skilled in the art to select the optimum intrinsic viscosity depending on conditions.

The thermoplastic polyester resin (b) used in the present invention is a polycondensate of an aliphatic diol and/or an alicyclic diol and a dicarboxylic acid or its functional derivative or a self-polycondensate of a compound having both a hydroxyl group or its functional derivative and a carboxyl group or its functional derivative in its molecule.

Examples of aliphatic diol and alicyclic diol are those which have straight or branched chain such as ethylene glycol, propylene glycol, 1,4-butanediol, neopentyl glycol, hexamethylene glycol, cyclohexane dimethanol, and 1,4-cyclohexanediol. These may be used alone or in combination of two or more.

Examples of dicarboxylic acid are aromatic dicarboxylic acids such as phthalic acid, isophthalic acid, terephthalic acid, and 2,6-naphthalenedicarboxylic acid and aliphatic dicarboxylic acids such as succinic acid, glutaric acid, and adipic acid. These may be used alone or in combination of two or more.

Typical examples of the functional derivatives of dicarboxylic acid are acid chlorides, methyl esters, phenyl esters and the like of the above mentioned carboxylic acids.

Examples of compounds having both hydroxyl group or functional derivative thereof and carboxylic acid or functional derivative thereof in their molecule are p-hydroxybenzoic acid, m-hydroxybenzoic acid, 2-oxy-6-carboxy-naphthalene, m-hydroxyethoxybenzoic acid and p-hydroxyethoxybenzoic acid. These may be used alone or in combination of two or more. Copolymers of these compounds with the above-mentioned diols and dicarboxylic acids may also be used.

Furthermore, various modified polymers such as polyether-ester block copolymers of the above compounds with polyethylene glycol or polypropylene glycol are also included.

Among them, especially preferred polyesters are polyethylene terephthalate, polybutylene terephthalate and modified products thereof.

In the present invention, the polyesters may be used alone or in combination of two or more.

Intrinsic viscosity (measured in phenol/ tetrachloroethane at 30° C.) of the polyester used in the present invention has no special limitation and is usually 0.35–2.0 dl/g, preferably 0.45–1.5 dl/g. Optimum intrinsic viscosity can be optionally chosen depending on the object of the present invention.

Mixing ratio of polyphenylene ether and polyester can be freely changed depending on object, but normally is polyphenylene ether: 5–95% by weight, preferably 30–70% by weight and polyester: 95–5% by weight, preferably 70–30% by weight. If amount of polyester is less than 5% by weight, effect of improving solvent resistance is small and if more than 95% by weight, thermal properties such as heat distortion temperature are apt to deteriorate.

As examples of the compound (c) represented by the formula: $(HO)_m R^1(COOR^2)_n$ (wherein $R^1$ represents a straight or branched chain saturated aliphatic hydrocarbon group of 2–20 carbon atoms, $R^2$ represents a hydrogen atom or an alkyl or aryl group of 1–20 carbon atoms, and $R^1$ and $R^2$ may be identical or different, and m and n each represents an integer of 1 or more), mention may be made of the following:

Hydroxyacetic acid, lactic acid, α-hydroxy-n-butyric acid, α-hydroxyisobutyric acid, α-hydroxy-n-valeric acid, α-hydroxyisovaleric acid, 2-hydroxy-2-methylbutanoic acid, α-hydroxy-n-caproic acid, α-hydroxyisocaproic acid, 2-ethyl-2-hydroxybutanoic acid, 2-hydroxy-3,3-dimethylbutanoic acid, 2-hydroxy-2-methylpentanoic acid, 2-hydroxy-5-methylhexanoic acid, 2-hydroxy-2,4-dimethylpentanoic acid, 3-hydroxypropionic acid, β-hydroxybutyric acid, β-hydroxyisobutyric acid, β-hydroxy-n-valeric acid, β-hydroxyisovaleric acid, 2-hydroxymethylbutanoic acid, hydroxypivalic acid, 3-hydroxy-2-methylpentanoic acid, 11-hydroxytetradecanoic acid, jalapinolic acid, 14-hydroxyhexadecanoic acid, sabinic acid, juniperic acid, hydroxymalonic acid, methyltartronic acid, ethyltartronic acid, n-propyltartronic acid, isopropyltartronic acid, hydroxymethylmalonic acid, hydroxyisopropylmalonic acid, ethyl-hydroxymethylmalonic acid, malic acid, α-methylmalic acid, α-hydroxy-α'-methylsuccinic acid, α-hydroxy-α',α'-dimethylsuccinic acid, α-hydroxy-α,α'-dimethylsuccinic acid, α-hydroxy-α'-ethylsuccinic acid, α-hydroxy-α'-methyl-α-ethylsuccinic acid, trimethylmalic acid, α-hydroxyglutaric acid, β-hydroxyglutaric acid, β-hydroxy-β-methylglutaric acid, α-hydroxyadipic acid, citric acid, isocitric acid, norcaperatic acid, agaricic acid, glyceric acid, α,β-dihydrobutyric acid, α,β-dihydroxyisobutyric acid, β,β'-dihydroxyisobutyric acid, β,γ-dihydroxybutyric acid, α,γ-dihydroxybutyric acid, β,β'-dihydroxyisobutyric acid, β,β'-dihydroxybutyric acid, α,γ-dihydroxy-β,β-dimethylbutyric acid, α,β-dihydroxy-α-isopropylbutyric acid, ipurolic acid, 9,10-dihydroxyoctadecanoic acid, tartaric acid (optically active substance or racemic modification), mesotartaric acid, methyltartaric acid, α,β-dihydroxyglutaric acid, α,γ-dihydroxyglutaric acid, α,γ-dihydroxy-β-methylglutaric acid, α,γ-dihydroxy-β-methyl-β-ethylglutaric acid, α,γ-dihydroxy-α,γ-dimethylglutaric acid, α,δ-dihydroxyadipic acid, β-γ-dihydroxyadipic acid, 6,7-dihydroxydodecanoic diacid, 7,8-dihydroxyhexadecanoic diacid, furoic acid, trihydroxybutyric acid, trihydroxyisobutyric acid, and trihydroxyglutaric acid.

The derivatives of the compound represented by the above formula are lactones or acid anhydrides derived from the above-mentioned hydroxycarboxylic acids or other hydroxycarboxylic acids. As examples of the derivatives, mention may be made of β-propiolactone, glycollide, lactide, β-methylpropiolactone, β,β-dimethylpropiolactone, β-n-propylpropiolactone, β-isopropylpropiolactone, β-methyl-β-ethylpropiolactone, γ-butyrolactone, γ-valerolactone, δ-valerolactone, δ-caprolactone, ε-caprolactone, 15-dihydroxypentadecanoic acid lactone, γ-butyrolactone-α-carboxylic acid, paraconic acid, α-methylparaconic acid, β-methylparaconic acid, α-ethylparaconic acid, α-isopropylparaconic acid, γ-methylparaconic acid, γ-ethylparaconic acid, α,γ-dimethylparaconic acid, β,γ-dimethylparaconic acid, α,α,β-trimethylparaconic acid, γ,γ-dimethylparaconic acid, nephrosteraic acid, γ-valerolactone-γ-carboxylic acid, γ-isopropyl-γ-butyrolactone-γ-carboxylic acid, α,α-dimethyl-γ-butyrolactone-γ-carboxylic acid, β-methyl-γ-valerolactone-γ-carboxylic acid, α,β-dimethyl-γ-valerolactone-γ-carboxylic acid, α,β-dimethyl-γ-butyrolactone-γ-carboxylic acid, homoisocarpic acid, α-(γ-oxycarbonyl-propyl)-γ-butyrolactone, β-hydroxyadipic acid γ-lactone, α,δ-dimethyl-β-hydroxyadipic acid γ-lactone, β-hydroxy-β-methyladipic acid γ-lactone, α-(δ'-carboxy-n-butyl)-γ-butyrolactone, α-methylisosuccinic acid lactone, cinchonic acid,α-hydroxy-γ-butyrolactone, β-hydroxy-γ-butyrolactone, δ-hydroxy-γ-valerolactone, pantolactone, mevalonic acid, malic anhydride, tartaric anhydride, hydroxyglutaric anhydride, α,β,γ-trihydroxyvaleric acid lactone, and α-hydroxy-α-hydroxy methyl-γ-butyrolactone. These may be used alone or in combination of two or more. Especially preferred are tartaric acid, malic acid and citric acid.

The hydroxycarboxylic acid or its derivative (c) may be used in such an amount that compatibility of polyphenylene ether and polyester can be improved and in general the amount is about 0.05-5 parts by weight, preferably 0.1-2 parts by weight per 100 parts by weight of polyphenylene ether (a) and thermoplastic polyester (b).

In practice of the present invention, other high molecular compounds and modifiers may further be added in order to improve physical and mechanical properties of the composition, for example, impact resistance and processability.

As examples of the other high molecular compounds, mention may be made of polyolefins such as polyethylene, polypropylene, ethylene-propylene block copolymer, polymethylpentene, ethylene-α-olefin copolymers (for example, ethylene-butene copolymer, ethylene-4-methyl-pentene copolymer and ethylene-pentene copolymer which have a density of 0.75-0.97 g/cm³); homopolymers and copolymers of various vinyl compounds such as polyvinyl chloride, polymethyl methacrylate, polyvinyl acetate, polyvinylpyridine, polyvinylcarbazole, polyacrylamide, polyacrylonitrile, ethylene-vinyl acetate copolymer and alkenyl aromatic resin; polycarbonate, polysulfone, polyether sulfone, polyethylene terephthalate, polybutylene terephthalate, polyarylene esters (for example, u polymer supplied by Unitika Ltd.), and polyphenylene sulfide; polyamides such as 6-nylon, 6,6-nylon, and 12-nylon; condensate high molecular compounds such as polyacetal; and rubber-like polymers (d). Furthermore, various thermoplastic resins such as silicone resin, fluorine-contained resin, polyimide, polyamideimide, phenol resin, alkyd resin, unsaturated polyester resin, epoxy resin, and Dapon resin are also included.

Of these high molecular compounds, preferred are polyolefins, polyamides, alkenyl aromatic resins, rubber modified alkenyl aromatic resins, and rubber-like polymers (d). Most preferred are alkenyl aromatic resins, rubber modified alkenyl aromatic resins, and rubber-like polymers (d).

The alkenyl aromatic resins used in the present invention are selected from those which contain at least 25% by weight of polymer unit derived from a monomer having the following formula:

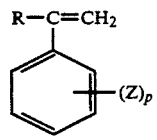

wherein R represents a hydrogen atom, a lower alkyl group (for example, alkyl group of 1-4 carbon atoms) or a halogen atom, Z represents a hydrogen atom, a vinyl group, a halogen atom, a hydroxyl group or a lower alkyl group and p represents 0 or an integer of 1-5.

Examples of alkenyl aromatic resins are homopolymers such as polystyrene, polychlorostyrene, and poly-α-methylstyrene and copolymers thereof and styrene-containing copolymers such as styrene-acrylonitrile copolymer, styrene-divinylbenzene copolymer, and styrene-acrylonitrile-α-methylstyrene copolymer. Of these resins, preferred are homopolystyrene, styrene-α-methylstyrene copolymer, styrene-acrylonitrile copolymer, styrene-α-chlorostyrene copolymer and styrene-methyl methacrylate copolymer. Especially preferred is homopolystyrene.

The rubber modified alkenyl aromatic resins used in the present invention mean those which have a two phase system comprising an alkenyl aromatic resin matrix in which rubber particles are dispersed. A method for producing these resins includes, for example, mechanical mixing of rubber-like polymer (d) mentioned hereinafter and alkenyl aromatic resin and a method comprising dissolving rubber-like polymer in an alkenyl aromatic monomer and successively polymerizing the alkenyl aromatic monomer. The latter method is industrially employed for producing so-called high-impact strength polystyrene. Furthermore, mixtures of the products obtained by the latter method with rubber-like polymer and/or alkenyl aromatic resin are also included in the rubber modified alkenyl aromatic resin of the present invention.

The rubber-like polymers (d) in the present invention mean natural or synthetic polymers which are elastic at room temperature, e.g., 20°-25° C. As examples thereof, mention may be made of natural rubber, diene rubbers (such as polybutadiene, polyisoprene and polychloroprene) and copolymers of diene and vinyl monomer (such as styrene-butadiene random copolymer, styrene-butadiene block copolymer, styrene-butadiene-styrene block copolymer, styrene-grafted polybutadiene, and butadiene-acrylonitrile copolymer), polyisobutylene, copolymer of isobutylene and butadiene or isoprene, ethylene-propylene copolymer, ethylene-propylene-diene copolymer, ethylene-acrylic acid copolymer and alkali metal salts thereof (so-called ionomer), ethylene-glycidyl acrylate copolymer, ethylene-alkyl acrylate copolymers (such as ethylene-ethyl acrylate copolymer and ethylene-butyl acrylate copolymer), thiokol rubber, polysulfide rubber, acrylic rubber, polyurethane rubber, polyether rubber, and epichlorohydrin rubber.

Moreover, the rubber-like polymers used in the present invention include those which are modified. As examples of these modifed rubber-like polymers, mention may be made of hydroxy or carboxy modified polybutadienes, partially or completely hydrogenated styrene-butadiene, styrene-butadiene-styrene, styrene-isoprene, and styrene-isoprene-styrene block copolymers, the above rubber-like polymers modified with unsaturated carboxylic acid or its derivative, for example, ethylene-propylene copolymer, ethylene-propylene-non-conjugated diene copolymer, styrene-butadiene copolymer (A-B or A-B-A' block, random and graft copolymers) and its hydrogenated copolymers, and styrene-isoprene copolymer (A-B or A-B-A' block, random and graft copolymers) and its hydrogenated copolymers which are modified with acrylic acid, glycidyl methacrylate or maleic anhydride. Modification can be carried out by known methods such as graft copolymerization and random copolymerization.

These rubber-like polymers may be used alone or in combination of two or more.

In the case of diene rubber and copolymers of diene and vinyl compound, those which are variously different in micro structure of double bond (vinyl group, cis-1,4 bond, trans 1,4-bond) may also be used as rubbers of the present invention.

Preferred rubbers are copolymers comprising 40–100% by weight of butadiene and 60–0% by weight of styrene, copolymers comprising 65–82% by weight of butadiene and 35–18% by weight of acrylonitrile, styrene-butadiene and styrene-butadiene-styrene block copolymers (including all of linear block copolymers, radial block copolymers, etc.) and hydrogenated products thereof, styrene-isoprene and styrene-isoprene-styrene block copolymers and hydrogenated products thereof, styrene-grafted polybutadiene (obtained by adding styrene to polybutadiene or butadiene-styrene copolymer latex and carrying out emulsion polymerization by a free-radical initiator), ethylene-propylene copolymer and ethylene-propylene-diene copolymer and these polymers which are modified with maleic anhydride, glycidyl methacrylate or styrene.

There is no limitation in method for production of the composition of the present invention and ordinary known methods are employed. From the industrial point of view, the method preferred comprises dry blending the respective components, for example, by Henschel mixer and then melt kneading and extruding the blend.

There are no special limitations in temperature and time for melt kneading, but the temperature, which may vary depending on ratio of the components, is generally 150°–350° C. Apparatus for kneading may be any ones as long as viscous melt can be handled and any of batch type and continuous type can be employed. Examples of the apparatuses are Banbury mixer, extruder, roller and kneader.

With reference to the order of kneading of respective components in melt kneading, all components may be simultaneously blended and melt kneaded or polyphenylene ether (a) and hydroxycarboxylic acid (c) are kneaded and thereafter polyester (b) may be added or polyester (b) and hydroxycarboxylic acid (c) are blended and then polyphenylene ether (a) may be added. Similarly, addition of other components such as rubber-like polymer (d) may be added at any stages.

In practice of the present invention, it is also possible to add known compounds, e.g., reinforcing agents such as glass fiber, carbon fiber, potassium titanate fiber, and high modulus polyamide fiber; inorganic and organic fillers such as carbon black, silica, $TiO_2$, talc, calcium carbonate, magnesium sulfate, and wollastonite; plasticizers such as triphenyl phosphate and phthalic acid esters; lubricating agents; stabilizers; flame retardants such as $Sb_2O_3$, halogen compounds and phosphoric acid ester; dyes; and pigments.

The following nonlimiting examples further explain the present invention.

EXAMPLES 1–4

Poly-(2,6-dimethyl-1,4-phenylene ether) having $[\eta]=0.40$ measured in $CHCl_3$ at 25° C. was used as polyphenylene ether (a).

Polyethylene terephthalate (abbreviated to "PET") having $[\eta]=1.0$ measured in phenol/tetrachloroethane at 30° C. or polybutylene terephthalate (abbreviated to "PBT") was used as polyester (b).

The above polyphenylene ether, the above polyester and hydroxycarboxylic acid (c) shown in Table 1 were dry blended and kneaded by an extruder (a twin-screw extruder PCM-30 manufactured by Ikegai Iron Works, Ltd.). (kneading temperature was about 275°–290° C.). The resulting pellets were compression molded and the molded product was etched with $CCl_4$ and particle diameter of the dispersed polyphenylene ether in the composition was measured by a phase contrast microscope.

The results are shown in Table 1.

COMPARATIVE EXAMPLES 1–3

Example 1 was repeated except that hydroxycarboxylic acid was not added (Comparative Example 1) and acrylic acid and fumaric acid were used as known compatibilizing agents (Comparative Examples 2 and 3). Particle diameter of dispersed polyphenylene ether in the composition was measured. The results are shown in Table 1.

TABLE 1

| | Blending ratio (part by weight) | | | | Diameter of dispersed particles ($\mu$) |
|---|---|---|---|---|---|
| | (a) Polyphenylene ether | (b) Polyester | (c) Hydroxy-carboxylic acid | | |
| Example | | | | | |
| 1 | 40 | PBT 60 | Malic acid | 2 | About 0.5–1 |
| 2 | 40 | PBT 60 | Tartaric acid | 1.5 | About 0.5–1.2 |
| 3 | 45 | PET 55 | Citric acid | 3 | About 0.2–1 |
| 4 | 30 | PET 70 | α-hydroxysuccinic anhydride | 1.0 | About 0.5–1 |
| Comparative Example | | | | | |
| 1 | 40 | PBT 60 | No | | More than about 5$\mu$ |
| 2 | 40 | PBT 60 | Acrylic acid | | More than about 5$\mu$ |

TABLE 1-continued

| | Blending ratio (part by weight) | | | Diameter of dispersed |
|---|---|---|---|---|
| | (a) Polyphenylene ether | (b) Polyester | (c) Hydroxy-carboxylic acid | particles (μ) |
| 3 | 40 | PBT 60 | Fumaric acid | More than about 5μ |

From the results of Table 1, it can be seen that the cbmposition containing the hydroxycarboxylic acid according to the present invention had extremely smaller dispersed particle size than the composition containing no hydroxycarboxylic acid. Thus, it is clear that the hydroxycarboxylic acid is superior as a compatibilizing agent. It is also clear that the compatibilizing agent of the present invention is much superior to known compatibilizing agents.

EXAMPLES 5-7

The following rubber-like polymers were added to the polyphenylene ether, polyester and hydroxycarboxylic acid used in Examples 1-4 at the ratio as shown in Table 2 and the mixture was kneaded by extruder in the same manner as in Examples 1-4 and injection molded. Then, properties of the molded product as shown in Table 2 were measured.

E-GMA: Ethylene-glycidyl acrylate copolymer BONDFAST®E manufactured by Sumitomo Chemical Co., Ltd.
SBS Styrene-butadiene-styrene block copolymer
SEBS : Hydrogenated styrene-butadiene-styrene block copolymer KRATON G-1650 manufactured by Shell Chemical Co.

COMPARATIVE EXAMPLE 4

Example 5 was repeated except that hydroxycarboxylic acid was not used. Properties measured are shown in Table 2.

TABLE 2

| | Blending ratio (part by weight) | | | | Izod impact strength | Heat distortion |
|---|---|---|---|---|---|---|
| | (a) Poly-phenylene ether | (b) Polyester | (c) Hydroxy-carboxylic acid | (d) Rubber-like polymer | (with notch) (Kg · cm/cm) | temperature under load of 18.6 kg (°C.) |
| Example | | | | | | |
| 5 | 40 | PET 60 | Tartaric acid 2.0 | E-GMA 15 | 56 | 89 |
| 6 | 45 | PBT 55 | Malic acid 1.5 | SBS 10 | 33 | 100 |
| 7 | 60 | PBT 40 | Citric acid 1.0 | SEBS 20 | 68 | 113 |
| Comparative Example | | | | | | |
| 4 | 40 | PET 60 | No | E-GMA 15 | 2.0 | 93 |

As explained above, the present invention can provide a resin composition which is excellent in mechanical properties such as solvent resistance and impact resistance and is well balanced in heat resistance and processability and besides shows no phase separation between polyphenylene ether and polyester and can provide molded articles excellent in appearance.

What is claimed is:

1. A resin composition having superior impact resistance and moldability, which consists essentially of:
  (a) a polyphenylene ether resin,
  (b) a thermoplastic polyester resin,
  (c) a compound represented by the formula:

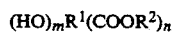

as a compatibilizing agent between (a) and (b), and
  (d) optionally, at least one member selected from the group consisting of rubbery polymer, and alkenyl aromatic resin;

wherein $R^1$ represents straight or branched chain saturated aliphatic hydrocarbon of 2-20 carbon atoms, $R^2$ represents hydrogen or alkyl or aryl of 1-20 carbon atoms and $R^1$ and $R^2$ may be identical or different and m and n each represents an integer of 1 or more or a derivative thereof.

2. A resin composition according to claim 1, wherein the polyphenylene ether resin (a) is obtained by oxidative polymerization of a phenol compound represented by the formula:

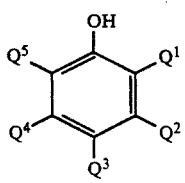

wherein $Q^1$, $Q^2$, $Q^3$, $Q^4$ and $Q^5$ each represents a hydrogen atom, a halogen atom, a hydrocarbon group, or a substituted hydrocarbon group, with a proviso that one of them is a hydrogen atom, with oxygen or an oxygen-containing gas in the presence of an oxidative coupling catalyst.

3. A resin composition according to claim 1, wherein the polyphenylene ether (a) has an intrinsic viscosity of 0.2-1.0 dl/g measured in chloroform at 30° C.

4. A resin composition according to claim 1, wherein the thermoplastic polyester resin (b) is a polycondensate of an aliphatic diol and/or an alicyclic diol and a dicarboxylic acid or a derivative thereof.

5. A resin composition according to claim 1, wherein the content of the polyphenylene ether if 5-95% by weight and that of the polyester if 95-5% by weight.

6. A resin composition according to claim 1, wherein the compound (c) is tartaric acid, malic acid or citric acid.

7. A resin composition according to claim 1, wherein the content of the compound (c) is about 0.05-5 parts by weight per 100 parts by weight of polyphenylene ether (a) and thermoplastic polyester (b).

8. A resin composition according to claim 1, wherein (d) is present.

9. A resin composition according to claim 8, wherein (d) is a rubbery polymer.

10. A resin composition according to claim 8, wherein (d) is an alkenyl aromatic resin.

11. A resin composition according to claim 8, wherein (d) is a rubber-modified alkenyl aromatic resin.